United States Patent
Takeya et al.

(10) Patent No.: US 9,272,693 B2
(45) Date of Patent: Mar. 1, 2016

(54) VEHICLE BRAKE CONTROLLER AND VEHICLE BRAKE CONTROL METHOD

(71) Applicant: ADVICS CO., LTD., Kariya (JP)

(72) Inventors: Yusuke Takeya, Miyoshi (JP); Takuya Inoue, Tokoname (JP); Masato Terasaka, Ichinomiya (JP)

(73) Assignee: ADVICS, CO., LTD., Kariya, Aichi-Pref. (JP)

( * ) Notice: Subject to any disclaimer, the term of this patent is extended or adjusted under 35 U.S.C. 154(b) by 128 days.

(21) Appl. No.: 13/845,605

(22) Filed: Mar. 18, 2013

(65) Prior Publication Data
US 2013/0261922 A1  Oct. 3, 2013

(30) Foreign Application Priority Data

Mar. 29, 2012  (JP) ................................. 2012-077060

(51) Int. Cl.
  *G06F 7/00* (2006.01)
  *B60T 8/1755* (2006.01)

(52) U.S. Cl.
  CPC ........... *B60T 8/1755* (2013.01); *B60T 2201/16* (2013.01); *B60T 2270/304* (2013.01)

(58) Field of Classification Search
  CPC .............. B60T 8/1755; B60T 2201/16; B60T 2270/304
  USPC .......................................................... 701/72
  See application file for complete search history.

(56) References Cited

U.S. PATENT DOCUMENTS

| 5,332,296 A * | 7/1994 | Morita ...................... B60T 8/00 303/125 |
| 2002/0052681 A1* | 5/2002 | Matsuno ............ B60K 23/0808 701/70 |
| 2002/0109403 A1* | 8/2002 | Yamamoto ................ B60T 8/00 303/146 |
| 2002/0171288 A1* | 11/2002 | Ahlgren ................ B60T 8/3205 303/139 |
| 2005/0012386 A1* | 1/2005 | Nakano ................... B60T 8/172 303/114.1 |
| 2005/0023895 A1* | 2/2005 | Yasutake ............... B60T 8/1755 303/146 |
| 2005/0236895 A1* | 10/2005 | Matsumoto ......... B60T 8/17557 303/140 |

(Continued)

FOREIGN PATENT DOCUMENTS

| JP | 4-237660 A | 8/1992 |
| JP | 2001-039286 A | 2/2001 |
| JP | 2008-273346 A | 11/2008 |

OTHER PUBLICATIONS

NPL: Acceleration. Date: N/A.*

(Continued)

*Primary Examiner* — Ian Jen
(74) *Attorney, Agent, or Firm* — Buchanan Ingersoll & Rooney PC (57) ABSTRACT

A vehicle brake controller is capable of executing limit control when a driver is performing a brake pedal operation during turning of a vehicle, to limit an increase in a braking force applied to an inner wheel that is a wheel positioned on the inner side of the turn. The vehicle brake controller is configured to start the limit control when a wheel state value that becomes greater as deceleration of the inner wheel becomes greater exceeds a start determination value that is set to a value greater than zero.

9 Claims, 5 Drawing Sheets

(56) References Cited

U.S. PATENT DOCUMENTS

| | | | | |
|---|---|---|---|---|
| 2006/0004508 A1* | 1/2006 | Kajiwara | B60C 23/04 701/70 |
| 2006/0113837 A1* | 6/2006 | Fukami | B60T 8/1755 303/140 |
| 2007/0129891 A1* | 6/2007 | Yano | B60T 7/22 701/301 |
| 2008/0255744 A1* | 10/2008 | Yasui | B60T 8/1755 701/70 |
| 2009/0037053 A1* | 2/2009 | Yamazaki | B60K 23/04 701/41 |
| 2011/0035129 A1* | 2/2011 | Yasui | B60T 8/17558 701/70 |
| 2012/0054054 A1* | 3/2012 | Kameyama | G01C 21/3608 705/26.1 |

OTHER PUBLICATIONS

Office Action issued on May 27, 2014, by the Japanese Patent Office in corresponding Japanese Patent Application No. 2012-077060. (2 pages).

* cited by examiner

Fig.5A Speed

Fig.5B Wheel Deceleration DVW

Fig.5C |Steering Angle Str|

Fig.5D |Lateral Acceleration Gy|

Fig.5E |Front-back Direction Deceleration Gx|

Fig.5F Brake Fluid Pressure

Fig.6A Speed

Fig.6B Wheel Deceleration DVW

Fig.6C Steering Angle Str

Fig.6D Lateral Acceleration Gy

Fig.6E Front-back Direction Deceleration Gx

Fig.6F Brake Fluid Pressure

VEHICLE BRAKE CONTROLLER AND VEHICLE BRAKE CONTROL METHOD

BACKGROUND OF THE INVENTION

The invention relates to a vehicle brake controller and a vehicle brake control method that adjust braking force of wheels provided in a vehicle.

Generally, in a case where lateral acceleration acting on a vehicle during turning is great, the center of gravity of the vehicle tends to move to the outer side of the turn, and vertical load of the wheels positioned on the inner side of the turn (hereinafter referred to as inner wheels) tends to be small. When the vertical load of the inner wheel becomes small, gripping force in the front-back direction and gripping force in the lateral direction of the inner wheels both decrease, and the vehicle easily may slip sideways. Further, even if a starting condition of an anti-lock braking control (hereinafter referred to as an ABS control) under such a situation is satisfied and slip ratio of the inner wheels is controlled, there is a risk of not being able to sufficiently stabilize the behavior of the vehicle due to a gripping force of the inner wheel that has been decreased by the reduction of the vertical load not being sufficiently recovered.

As a brake controller that can solve such a problem, a device described for example in Japanese Laid-Open Patent Publication No. 4-237660 has conventionally been proposed. In the brake controller, in a case where the starting condition of the ABS control is satisfied while the vehicle is turning, the stabilization of the behavior of the vehicle is attempted by differentiating a manner of control for the wheels positioned on the outer side of the turn (hereinafter referred to as an outer wheels) and a manner of control for the inner wheels. Specifically, in the ABS control for the outer wheels, brake fluid pressure in wheel cylinders corresponding to the outer wheels is controlled such that the slip ratio of the outer wheels becomes optimal. At this time, the brake fluid pressure in the wheel cylinder corresponding to the outer wheels (hereinafter referred to as an outer wheel fluid pressure) is detected.

With respect to this, in the ABS control for the inner wheels, a gain value that is set to a smaller value as a lateral acceleration becomes greater is calculated due to the vertical load of the inner wheel becoming smaller as the lateral acceleration becomes greater. A control fluid pressure for the inner wheels is calculated by multiplying the gain value to the detected outer wheel fluid pressure, and a brake fluid pressure in a wheel cylinder corresponding to the inner wheels is controlled to be the control fluid pressure for the inner wheels.

Incidentally, in the above solution (hereinafter referred to as a first solution), costs of the controller are high because pressure sensors for detecting the brake fluid pressure in the wheel cylinders are necessary. Further, the optimal slip ratio of a wheel is different depending on the μ value of the road surface that the wheel contacts. Due to this, for example, in a case where the vehicle runs on a road surface in which the μ value of the road surface that the outer wheels contact and the μ value of the road surface that the inner wheels contact are different, the slip ratio of the inner wheels does not necessarily become optimal even if the control fluid pressure for the inner wheels is set based on the outer wheel fluid pressure. This is because deceleration of a wheel changes depending on the μ value of the road surface that the wheel contacts, even if the brake fluid pressure in the wheel cylinder corresponding to the wheel is constant. When the slip ratio of the inner wheels is deviated far off from being optimal as above, the gripping force of the inner wheels also does not sufficiently recover.

Further, the vertical load of the inner wheels changes depending on the loading of the vehicle even if the lateral acceleration is constant. Due to this, the control fluid pressure for the inner wheels set without taking the loading of the vehicle into consideration is not necessarily optimal for the inner wheels at that time.

Thus, in recent years, a method for achieving stabilization of the behavior of a turning vehicle (hereinafter referred to as a second solution) in a method different from the above first solution has been proposed. In the second solution, it is determined that a vehicle is performing a high-G turning, in which the vehicle turns in a state under a great lateral acceleration when the lateral acceleration acting on the turning vehicle exceeds a high-lateral G determination value, and limit control to limit an increase in braking force of the inner wheel is started. Due to this, the decrease of the gripping force of the inner wheel is reduced, and the behavior of the vehicle is stabilized.

Even during the execution of the limit control, the ABS control is executed on the inner wheels if the starting condition of the ABS control is satisfied. In this case, the braking force of the inner wheels may be increased by the ABS control being executed.

In the above second solution, the decrease in the gripping force of the inner wheel is suppressed by maintaining the braking force of the inner wheels when it is determined that the vehicle is performing the high-G turning. In this case, if the driver starts a brake pedal operation after the vehicle has been determined to be performing the high-G turning, the braking force is not applied to the inner wheel. Due to this, although the stability of the behavior of the vehicle is ensured by executing the limit control, the actual deceleration of the vehicle becomes small compared to required deceleration corresponding to the amount of the brake pedal operation by the driver.

SUMMARY OF THE INVENTION

An objective of the present invention is to provide a vehicle brake controller and a vehicle brake control method that allow increase in deceleration of a vehicle that is turning, while ensuring the stability of the behavior of the vehicle.

To achieve the foregoing objective, a vehicle brake controller is provided that is capable of executing limit control when a driver is performing a brake pedal operation during turning of a vehicle, to limit an increase in a braking force applied to an inner wheel that is a wheel positioned on an inner side of the turn. The vehicle brake controller is configured to start the limit control when a wheel state value that becomes greater as deceleration of the inner wheel becomes greater exceeds a start determination value that is set to a value greater than zero.

When a wheel state value of the inner wheel of the turning vehicle is at a start determination value or less, the braking force is applied to the inner wheel since the gripping force of the inner wheel relative to the road surface is presumed to be sufficiently great. The limit control is started when the wheel state value of the inner wheel becomes great and the wheel state value exceeds the start determination value, and the increase in the breaking force of the inner wheel starts to be limited. That is, even if the braking force is applied to the inner wheel, the vehicle turns in a state in which the gripping force of the inner wheel is ensured to some degree by the limit control. Due to this, even during executing the limit control, the stability of the behavior of the vehicle upon turning is ensured, and the deceleration of the vehicle is increased.

To achieve the forgoing objective, a vehicle brake control method is provided that includes: identifying, when a driver is performing a brake pedal operation during turning of a vehicle, an inner wheel that is a wheel positioned on an inner side of the turn; acquiring a wheel state value that becomes greater as deceleration of the inner wheel becomes greater; and starting limit control when the acquired wheel state value exceeds a start determination value that is set to a value greater than zero, thereby limiting an increase in a braking force applied to the identified inner wheel.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Herein below, one embodiment of a vehicle brake controller will be described with reference to FIGS. 1 to 6.

Figure 1:
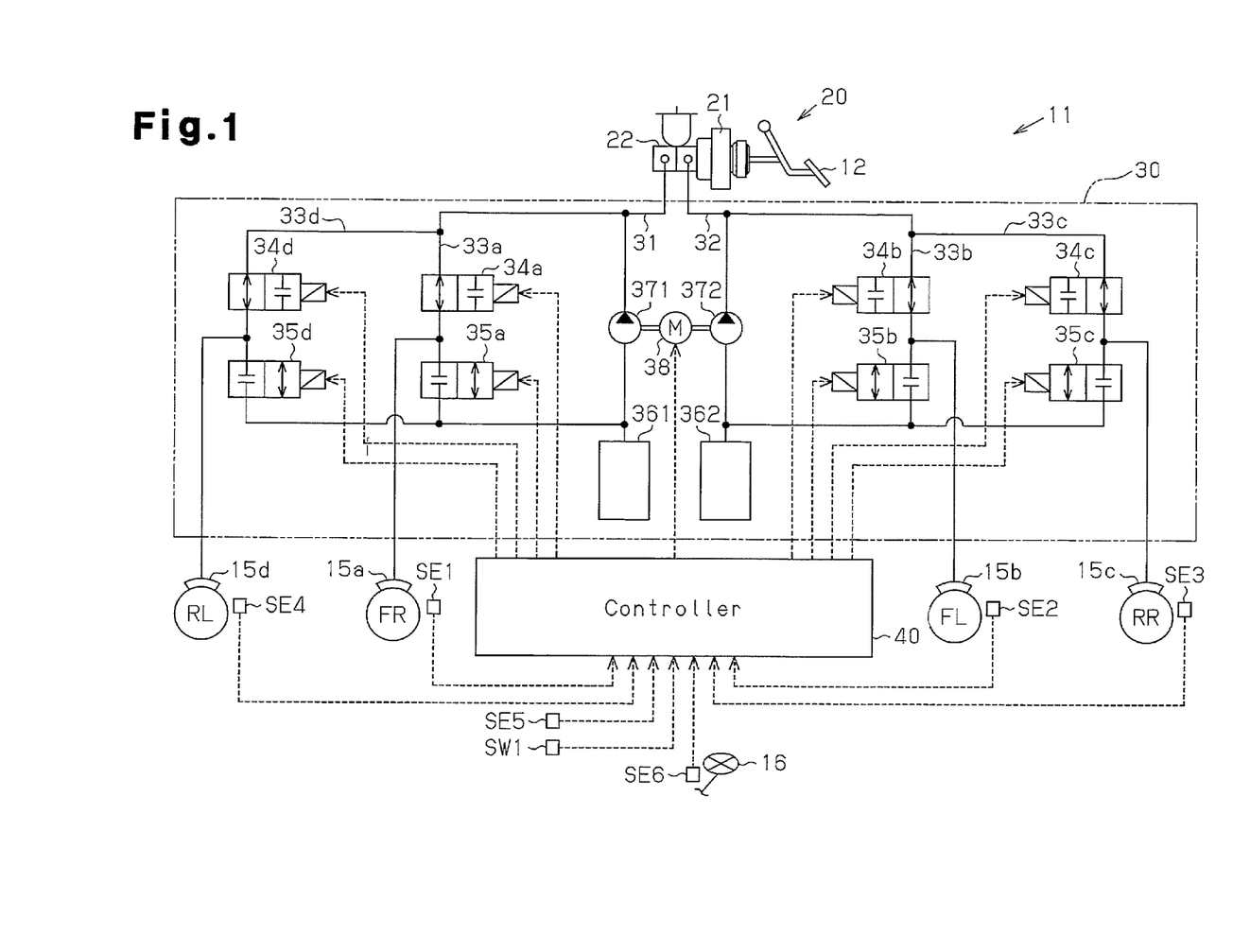
FIG. 1 is a block diagram of a braking device to be installed in a vehicle.

As shown in FIG. 1, a braking device 11 is installed in a vehicle having a plurality of (four in the present embodiment) wheels (the right front wheel FR, the left front wheel FL, the right rear wheel RR, and the left rear wheel RL). The braking device 11 includes a fluid pressure generating device 20 to which a brake pedal 12 is connected, a brake actuator 30 that adjusts braking force of the respective wheels FR, FL, RR, RL, and a controller 40 as a brake controller that controls the brake actuator 30.

The fluid pressure generating device 20 is provided with a booster 21 that boosts a brake pedal operating force by a driver, and a master cylinder 22 that generates a brake fluid pressure corresponding to the brake pedal operating force boosted by the booster 21 (hereinafter referred to as an MC pressure). In a case where the brake pedal operation is being performed by the driver, brake fluid corresponding to the MC pressure generated in the master cylinder 22 is supplied there from to wheel cylinders 15a, 15b, 15c, 15d corresponding to the wheels FR, FL, RR, RL via the brake actuator 30. In so doing, braking force corresponding to brake fluid pressure generated in the wheel cylinders 15a to 15d (hereinafter referred to as WC pressure) is applied to the wheels FR, FL, RR, RL.

The brake actuator 30 is provided with a first fluid pressure circuit 31 to be connected to the wheel cylinder 15a for the right front wheel and to the wheel cylinder 15d for the left rear wheel, and a second fluid pressure circuit 32 to be connected to the wheel cylinder 15b for the left front wheel and to the wheel cylinder 15c for the right rear wheel. The first fluid pressure circuit 31 is provided with a path 33a for the right front wheel and a path 33d for the left rear wheel, and the second fluid pressure circuit 32 is provided with a path 33b for the left front wheel and a path 33c for the right rear wheel. The paths 33a to 33d are provided with booster valves 34a, 34b, 34c, 34d that are normally-open type solenoid valves that operate when limiting increase in the WC pressure of the wheel cylinders 15a to 15d, and reducing valves 35a, 35b, 35c, 35d that are normally-closed type solenoid valves that operate upon reducing the WC pressure.

Further, the fluid pressure circuits 31, 32 are provided with reservoirs 361, 362 in which the brake fluid that has flowed out from the wheel cylinders 15a to 15d via the reducing valves 35a to 35d is temporarily stored, and pumps 371, 372 for drawing the brake fluid temporarily stored in the reservoirs 361, 362 and discharging the same toward the master cylinder 22 of the fluid pressure circuits 31, 32. The pumps 371, 372 are driven by a common drive motor 38.

Next, the controller 40 will be described. Wheel speed sensors SE1, SE2, SE3, SE4 for detecting wheel speed (outer circumferential velocity) of the respective wheels FR, FL, RR, RL, and a lateral acceleration sensor SE5 for detecting the lateral acceleration acting on the vehicle are electrically connected to an input-side interface of the controller 40 that functions as a control unit. Further, a steering angle sensor SE6 for detecting the steering angle of a steering wheel 16, and a brake switch SW1 for detecting presence and absence of an operation of the brake pedal 12 are electrically connected to the input-side interface. Further, the respective valves 34a to 34d, 35a to 35d, and the drive motor 38 and the like are electrically connected to an output-side interface of the controller 40. The controller 40 controls operation of the respective valves 34a to 34d, 35a to 35d, and the drive motor 38 based on various detection signals from the respective sensors SE1 to SE6, and the brake switch SW1.

The controller 40 includes a microcomputer configured of a CPU, a ROM, a RAM, and the like. The ROM of the microcomputer stores in advance various control processes, various maps, various thresholds and the like. Further, the RAM stores various types of information that are suitably rewritten while the ignition switch (not shown) of the vehicle is on.

Incidentally, when the vehicle is turning, lateral acceleration acts on the vehicle. In a case where the braking force is applied to the respective wheels FR, FL, RR, RL such as during the brake pedal operation by the driver, the vertical load of the inner wheels (especially the inner rear wheel), which are wheels positioned on the inner side of the turn, tends to be smaller as the lateral acceleration acting on the vehicle becomes greater, whereby the gripping force of the inner wheels tends to decrease. Especially, when the gripping force in the lateral direction decreases, the behavior of the vehicle becomes unstable, and the vehicle easily slips sideways. Due to this, when the lateral acceleration acting on the vehicle is great under the state in which the braking force is applied to the respective 5, wheels FR, FL, RR, RL, it is preferable to perform the limit control to limit the increase of the braking force applied to the inner wheels, especially the inner rear wheel, and suppress the decrease of the gripping force of the inner rear wheel. In the present embodiment, when the limit control is started, the braking force applied to the inner rear wheel is maintained.

Figure 2:
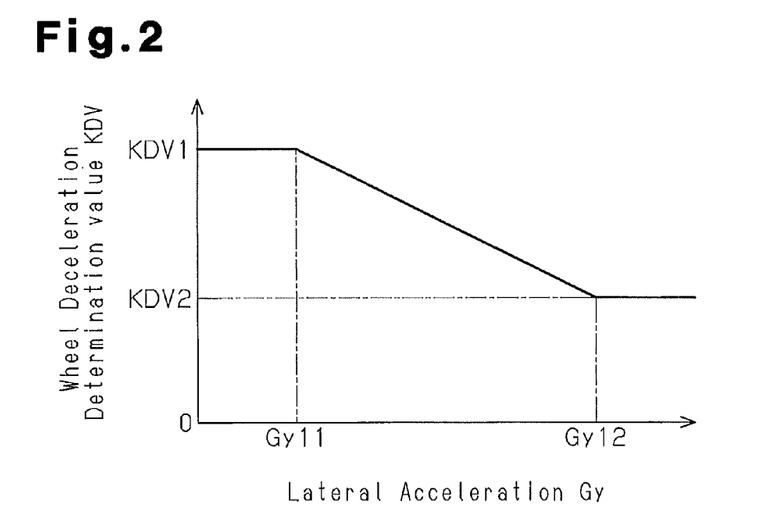
FIG. 2 is a map for setting a wheel deceleration determination value based on lateral acceleration.
Figure 3:
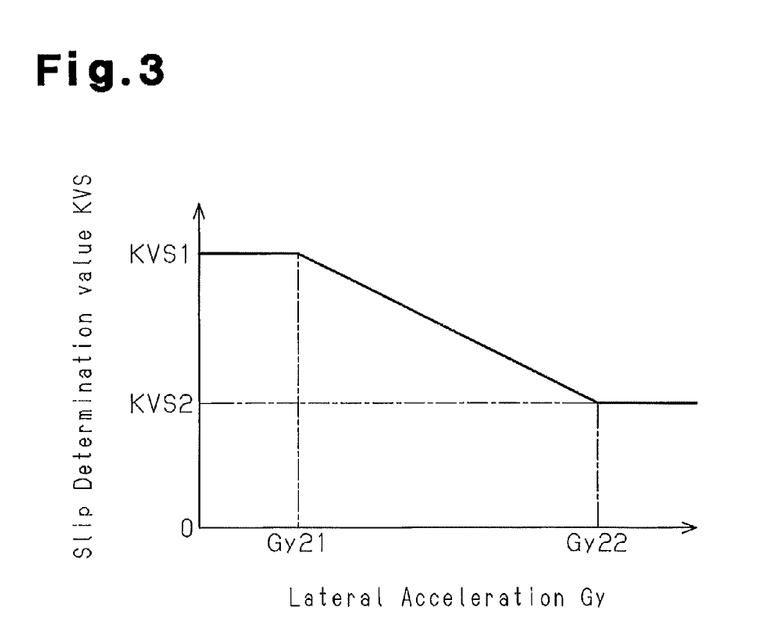
FIG. 3 is a map for setting a slip determination value based on lateral acceleration.

Next, various maps used in suppressing the decrease in the gripping force of the inner rear wheel will be described with reference to FIGS. 2 and 3.

Firstly, the map shown in FIG. 2 will be described. The map is a map for setting a wheel deceleration determination value KDV as a start determination value for determining the timing to start the limit control. As shown in FIG. 2, in a case where the lateral acceleration Gy acting on the vehicle is great, the wheel deceleration determination value KDV is set to a value that is smaller than in a case where the lateral acceleration Gy is small. Specifically, the wheel deceleration determination value KDV is set to a first deceleration KDV1 (for example, 1.0 G) in a case where the lateral acceleration Gy is less than a first acceleration Gy11 (for example, 0.4 G). Further, the wheel deceleration determination value KDV is set to a second deceleration KDV2 (for example, 0.2 G) that is smaller than the first deceleration KDV1 in a case where the lateral acceleration Gy is greater than or equal to a second acceleration Gy12 (for example, 0.8 G) that is greater than the first acceleration Gy11. In a case where the lateral acceleration Gy is greater than or equal to the first acceleration Gy11 and less than the second acceleration Gy12, the wheel deceleration determination value KDV is set to a smaller value as the lateral acceleration Gy becomes greater.

During the brake pedal operation by the driver, a body speed of the vehicle is calculated based on a greatest value among the wheel speeds of the respective wheels FR, FL, RR, RL. Due to this, if the second deceleration KDV2 is set to zero G, the braking force may not be applied at all to the inner rear wheel during the brake pedal operation. Especially when the vehicle is turning, since the vertical load of the inner rear wheel is small, the rotational speed of the inner rear wheel may be significantly greater than the rotational speeds of other wheels. In this case, since the body speed will be calculated based on the wheel speed of the inner rear wheel, such a body speed has a risk of being greatly diverged from the actual body speed. Due to this, in order to suppress decrease in the calculation accuracy of the body speed, the second deceleration KDV2 is preferably set to a value greater than zero G. By so doing, even if the limit control is started during turning of the vehicle, the incidence of the braking force not being applied at all to the inner rear wheel is more unlikely to occur.

Next, the map shown in FIG. 3 will be described. The map is a map for setting a slip determination value KVS as a spin determination value for determining the timing to end the limit control. As shown in FIG. 3, in the case where the lateral acceleration Gy acting on the vehicle is great, the slip determination value KVS is set to a smaller value than in the case where the lateral acceleration Gy is small. Specifically, the slip determination value KVS is set to a first slip ratio KVS1 (for example, 3%) in a case where the lateral acceleration Gy is less than a first acceleration Gy21 (for example, 0.4 G). Further, the slip determination value KVS is set to a second slip ratio KVS2 (for example, 1.5%) that is smaller than the first slip ratio KVS1 in a case where the lateral acceleration Gy is greater than or equal to a second acceleration Gy22 (for example, 0.8 G) that is greater than the first acceleration Gy21. In a case where the lateral acceleration Gy is greater than or equal to the first acceleration Gy21 and less than the second acceleration Gy22, the slip determination value KVS is set to a smaller value as the lateral acceleration Gy becomes greater.

Figure 4:
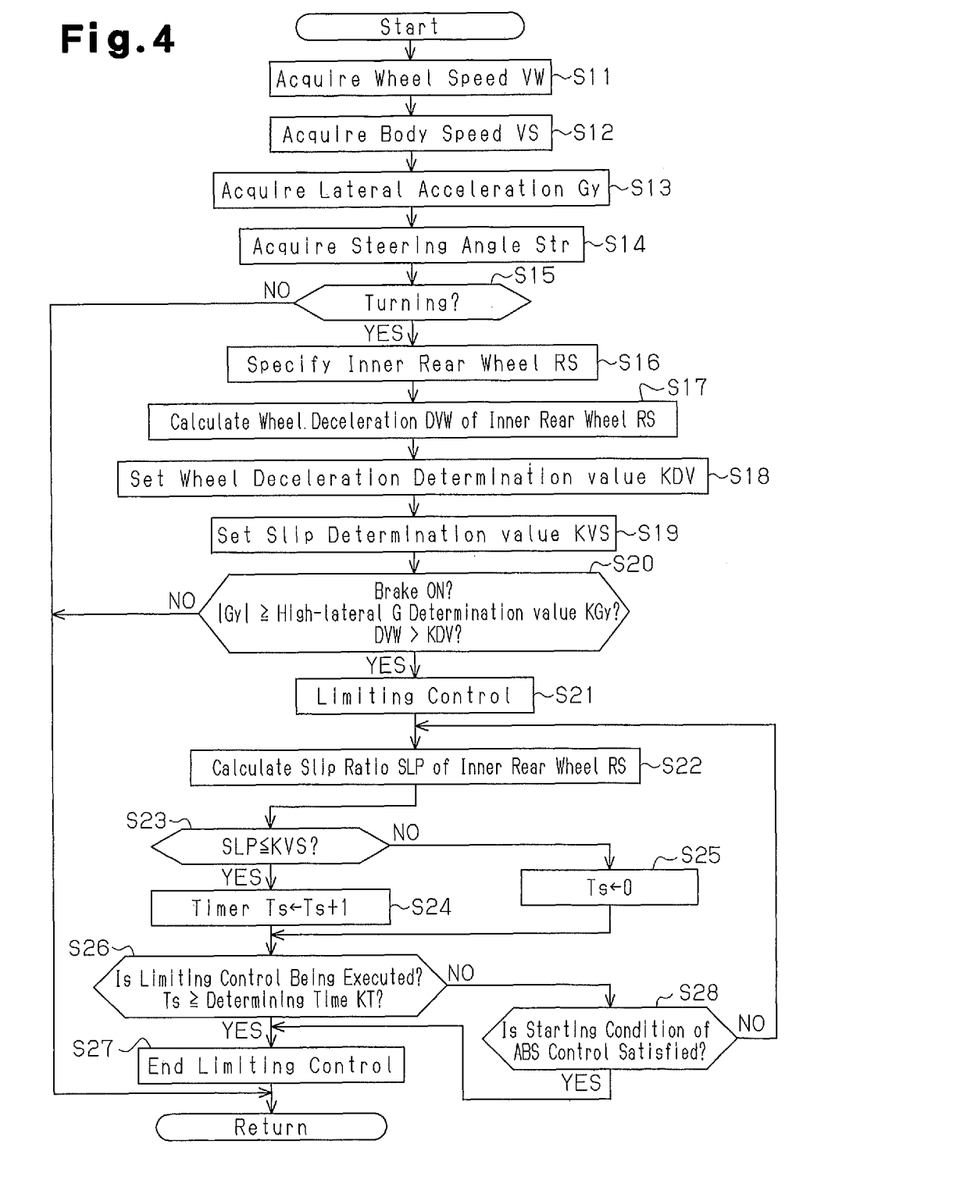
FIG. 4 is a flowchart showing a process routine executed by a vehicle brake controller of one embodiment.

Next, a process routine that the controller 40 of the present embodiment performs will be described with reference to a flowchart shown in FIG. 4.

The process routine is executed in certain cycles set in advance while the driver is performing the brake pedal operation. In the process routine, the controller 40 acquires wheel speeds (outer circumferential velocity) VW of the respective wheels FR, FL, RR, RL based on the detection signals from the respective wheel speed sensors SE1 to SE4 (step S11). Subsequently, the controller 40 acquires the body speed VS of the vehicle based on the wheel speed of at least one wheel among the respective wheels FR, FL, RR, RL (step S12). The controller 40 acquires the lateral acceleration Gy based on the detection signal from the lateral acceleration sensor SE5 (step S13), and acquires the steering angle Str of the steering wheel 16 based on the detection signal from the steering angle sensor SE6 (step S14).

Subsequently, the controller 40 determines whether the vehicle is turning based on the steering angle Str acquired in step S14 (step S15). For example, it is determined whether the vehicle is turning depending on whether the absolute value of the steering angle Str is greater than or equal to a turn determination value set in advance. In a case where the vehicle is not turning (step S15: NO), the controller 40 temporarily suspends the process routine.

On the other hand, in a case where the vehicle is tuning (step S15: YES), the controller 40 specifies the rear wheel positioned on the inner side of the turn, that is, the inner rear wheel RS based on the positive or negative sign of the steering angle Str and the like (step S16). That is, the controller 40 determines the right rear wheel RR to be the inner rear wheel RS in a case where the vehicle is turning right, and determines the left rear wheel RL to be the inner rear wheel RS in a case where the vehicle is turning left. Accordingly, in the present embodiment, step S16 corresponds to an identifying step for identifying the inner rear wheel RS of the turning vehicle. The controller 40 calculates a wheel deceleration DVW that is a rate of change of the wheel speed VW of the inner rear wheel RS identified in step S16 (step S17). In the present embodiment, the wheel deceleration DVW becomes a positive value when the vehicle is slowing down, and becomes a negative value during acceleration. Due to this, the wheel deceleration DVW is a value that becomes greater as the deceleration of the wheels become greater. That is, the wheel deceleration DVW corresponds to a wheel state value that is obtained by quantifying a decreasing tendency of the gripping force of the inner rear wheel RS (especially, the gripping force in the lateral direction). Accordingly, in the present embodiment, step S17 corresponds to an acquiring step. The controller 40 and the wheel speed sensors SE1 to SE4 configure an acquiring unit that acquires the wheel state value.

Subsequently, by using the map shown in FIG. 2, the controller 40 sets the wheel deceleration determination value KDV to a value corresponding to the lateral acceleration Gy acquired in step S13 (step S18). By using the map shown in FIG. 3, the controller 40 sets the slip determination value KVS to a value corresponding to the lateral acceleration Gy acquired in step S13 (step S19). Subsequently, the controller 40 determines whether all of first, second and third conditions described below are satisfied (step S20). A high-lateral G determination value KGy is set in advance as determination criteria on whether the lateral acceleration acting on the turning vehicle is great. In the present embodiment, the high-lateral G determination value KGy is set to a same value as the aforementioned first acceleration Gy11.

First Condition: the brake pedal operation is being performed.

Second Condition: the absolute value of the lateral acceleration Gy is greater than or equal to the high-lateral G determination value KGy (for example, 0.4 G) set in advance.

Third Condition: The wheel deceleration DVW of the inner rear wheel RS exceeds the wheel deceleration determination value KDV.

In a case where at least one of the first to third conditions is not satisfied (step S20: NO), the controller 40 temporarily suspends the process routine without executing the limit control. That is, in the present embodiment, even if the wheel deceleration DVW of the inner rear wheel RS exceeds the wheel deceleration determination value KDV, the execution of the limit control is inhibited if the absolute value of the lateral acceleration Gy is less than or equal to the high-lateral G determination value KGy. On the other hand, in a case where all of the first to third conditions are satisfied (step S20: YES), the controller 40 starts the limit control to limit the increase in the braking force applied to the inner rear wheel RS (step S21). Specifically, the controller 40 causes a booster valve provided in a path for the inner rear wheel RS to be in a closed state. For example, in the case where the inner rear wheel RS is the right rear wheel RR, the controller 40 causes the booster valve 34c to be in the closed state. Due to this, the WC pressure within the wheel cylinder for the inner rear wheel RS is maintained, and the braking force applied to the inner rear wheel RS is maintained. Accordingly, in the present embodiment, step S21 corresponds to a limiting step.

Subsequently, the controller 40 calculates a slip ratio SLP of the inner rear wheel RS based on the wheel speed VW and the body speed VS of the inner rear wheel RS at that time (step S22). Since the gripping force in the lateral direction of the inner rear wheel RS becomes smaller as the slip ratio SLP of the inner rear wheel RS is higher, a spinning tendency of the vehicle becomes greater. Accordingly, the slip ratio SLP of the inner rear wheel RS corresponds to a spin tendency value. The controller 40 and the wheel speed sensors SE1 to SE4 configure an acquiring unit that acquires the spin tendency value.

The controller 40 determines whether the slip ratio SLP of the inner rear wheel RS calculated in step S22 is less than or equal to the slip determination value KVS set in step S19 (step S23). In a case where the slip ratio SLP is less than or equal to the slip determination value KVS (step S23: YES), the controller 40 increments a timer Ts by 1 (step S24), and shifts the process to step S26, which will be described below. On the other hand, in a case where the slip ratio SLP exceeds the slip determination value KVS (step S23: NO), the controller 40 resets the timer Ts to zero (step S25), and shifts the process to next step S26.

In step S26, the controller 40 determines whether all of fourth and fifth conditions shown below are satisfied. A determination time KT is a value that is set in advance in order to determine that a possibility that the vehicle behavior becomes unstable is low when the slip ratio SLP being less than or equal to the slip determination value KVS continued over some time. For example, the determination time KT is set to a value corresponding to 100 milliseconds.

Fourth Condition: The limit control is being executed.

Fifth Condition The timer Ts is greater than or equal to the determination value time KT set in advance.

In a case where both of the fourth and fifth conditions are satisfied (step S26: YES), the controller 40 ends the limit control (step S27). At this time, the controller 40 causes the value of the current to be flowed in the booster valve for the inner rear wheel RS to be zero, and causes the booster valve to be in an opened state. Due to this, the increase of the braking force applied to the inner rear wheel RS is allowed. Thereafter, the controller 40 temporarily suspends the process routine.

On the other hand, in a case where at least one of the fourth and fifth conditions is not satisfied (step S26: NO), the controller 40 determines whether a starting condition of an ABS control (anti-lock braking control) for the inner rear wheel RS is satisfied, that is, whether the braking force applied to the inner rear wheel RS needs to be decreased (step S28). In a case where the starting condition of the ABS control is satisfied (step S28: YES), the controller 40 shifts the process to the aforementioned step S27. In this case, the controller 40 ends the limit control, and starts the ABS control on the inner rear wheel RS.

In a case where the starting condition of the ABS control is not satisfied (step S28: NO), the controller 40 does not end the limit control at this timing, and shifts the process to the aforementioned step S22.

Next, an operation of the vehicle of the present embodiment will be described.

To begin with, a case in which the starting condition of the ABS control on the inner rear wheel RS is satisfied when the limit control is being executed will be described with reference to timing charts shown in FIG. 5.

Figure 5A:
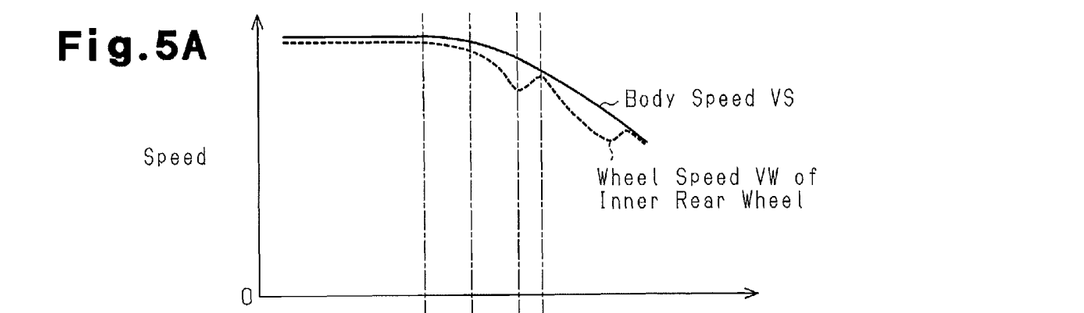
FIGS. 5A to 5F are timing charts showing how limit control is executed on an inner rear wheel of the turning vehicle.
Figure 5B:
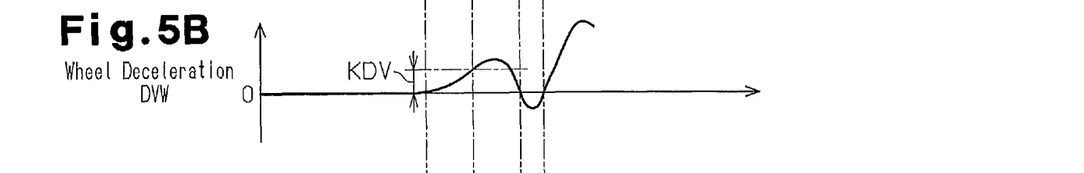
Figure 5C:
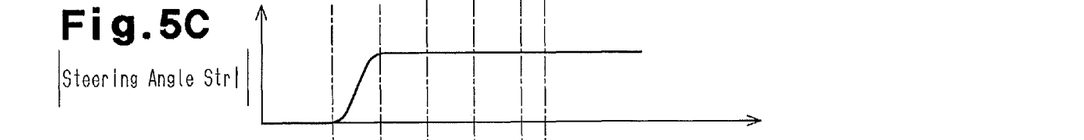
Figure 5D:
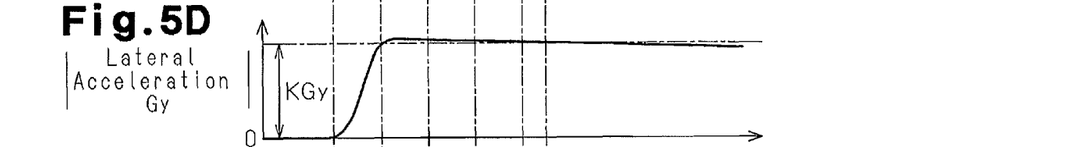

As shown in FIG. 5C, when the operation of the steering wheel 16 by the driver is started at first point in time t11 while the vehicle is driving, the vehicle starts to turn. Then, as shown in FIGS. 5C and 5D, the lateral acceleration Gy acting on the vehicle becomes greater as the steering angle Str of the steering wheel 16 becomes greater. When second point in time t12 is passed, the absolute value of the lateral acceleration Gy acting on the vehicle exceeds the high-lateral G determination value KGy, and the aforementioned second condition is satisfied.

Figure 5E:
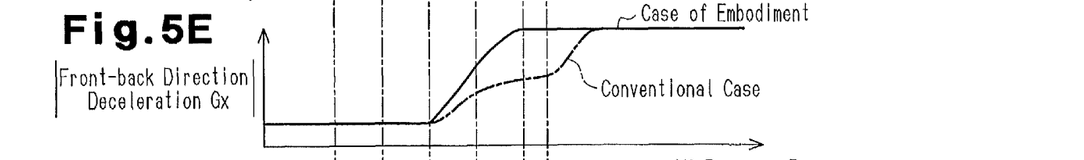
Figure 5F:
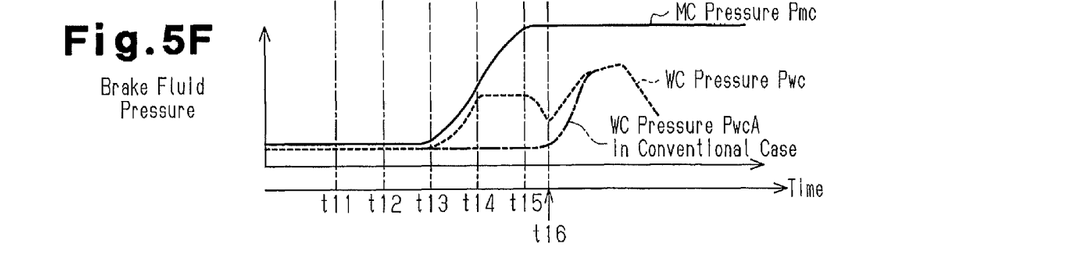

At third point in time t13 thereinafter, when the driver starts brake pedal operation, as shown in FIG. 5F, the MC pressure. Pmc of the master cylinder 22 is increased in accordance with an increase in the amount of the brake pedal operation by the driver. Further, since the WC pressure Pwc of the respective wheel cylinders 15a to 15d is increased to follow the increase in the MC pressure Pmc, the braking force is applied to the respective wheels FR, FL, RR, RL, whereby deceleration of the vehicle starts as shown in FIG. 5A. At this time, since the lateral acceleration Gy acting on the turning vehicle is great, the vertical load of the inner rear wheel RS is being small. Due to this, the deceleration in the wheel speed VW of the inner rear wheel RS becomes great compared to the deceleration of the wheel speed VW of the other wheels.

In a conventional case where the aforementioned third condition is not included in the starting condition of the limit control, the limit control is started at the second point in time t12, at which the lateral acceleration Gy exceeds the high-lateral G determination value KGy during the turning of the vehicle. At the second point in time t12, the brake pedal operation is not yet started. Due to this, even if the brake pedal operation is started at the third point in time t13, the WC pressure PwcA of the wheel cylinder for the inner rear wheel RS is not increased, as shown in a line formed by a long dash alternating with a short dash in FIG. 5F. That is, a no-braking period is generated in which no braking force is applied to the inner rear wheel RS. The no-braking period is a period from the third point in time t13 to sixth point in time t16, at which the increase in the WC pressure PwcA is started in accordance with the starting condition of the ABS being satisfied.

In this respect, in the present embodiment, in the case where the wheel deceleration DVW is less than or equal to the wheel deceleration determination value KDV that is set to the value corresponding to the lateral acceleration Gy at that time, the limit control is not executed; that is, the increase in the braking force applied to the inner rear wheel RS is allowed. As shown in FIGS. 5B and 5F, the limit control is started at fourth point in time t14, at which the wheel deceleration DVW of the inner rear wheel RS exceeds the wheel deceleration determination value KDV. In so doing, at the fourth point in time t14 and thereinafter, the WC pressure Pwc in the wheel cylinder for the inner rear wheel RS is maintained, and the braking force applied to the inner rear wheel RS is maintained.

Accordingly, in the present embodiment, in which the application of the braking force to the inner rear wheel RS to some degree is allowed even in the case where the lateral acceleration Gy acting on the turning vehicle becomes great, the braking force of the vehicle on the whole is great compared to the conventional case. As a result, as shown in FIG. 5E, a period is generated in which a longitudinal acceleration Gx (shown by a solid line) that acts on the vehicle in the case of the present embodiment is greater than a longitudinal acceleration Gx (shown by a line formed by a long dash alternating with a short dash) acting on the vehicle in the conventional case. That is, the deceleration of the vehicle becomes great, and the deceleration of the vehicle approaches a required deceleration corresponding to the amount of the brake pedal operation by the driver.

Thereinafter, when the starting condition of the ABS is satisfied at the fifth point in time t15 by the slip ratio of the inner rear wheel RS becoming great or the like, the limit control is ended, and the ABS control is started. That is, the WC pressure Pwc of the wheel cylinder for the inner rear wheel RS is decreased, and the increase in the WC pressure Pwc is started from the sixth point in time t16 thereinafter. Until an ending condition of the ABS control is satisfied, the decrease and increase of the WC pressure Pwc and retaining thereof depending on the situation is repeated.

Next, a case in which the ending condition of the limit control is satisfied when the limit control is being executed will be described with reference to timing charts shown in FIG. 6.

Figure 6A:
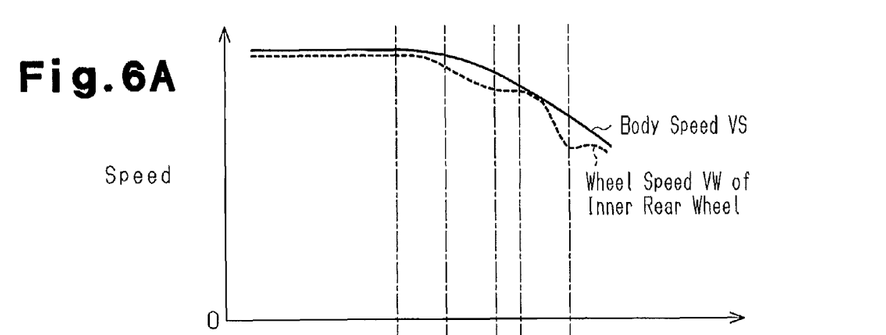
FIGS. 6A to 6F are timing charts showing how the limit control is executed on the inner rear wheel of the turning vehicle.
Figure 6B:
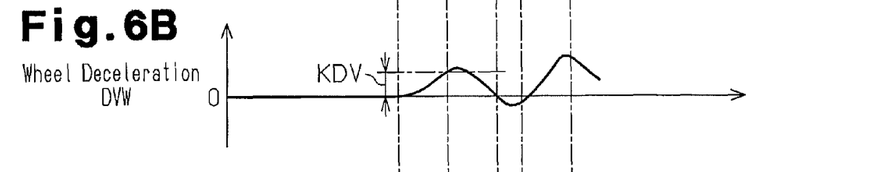
Figure 6C:
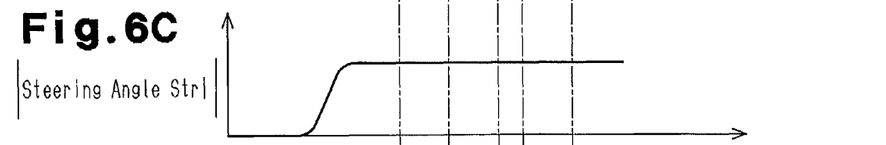
Figure 6D:
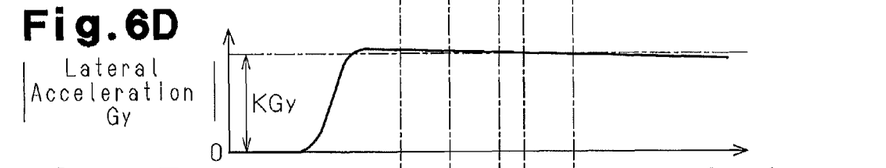
Figure 6E:
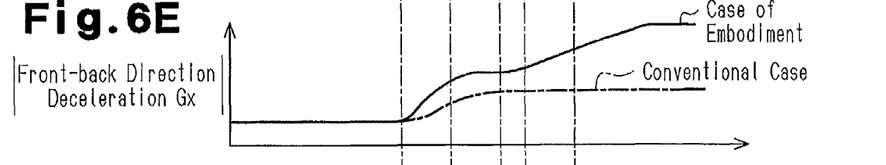
Figure 6F:
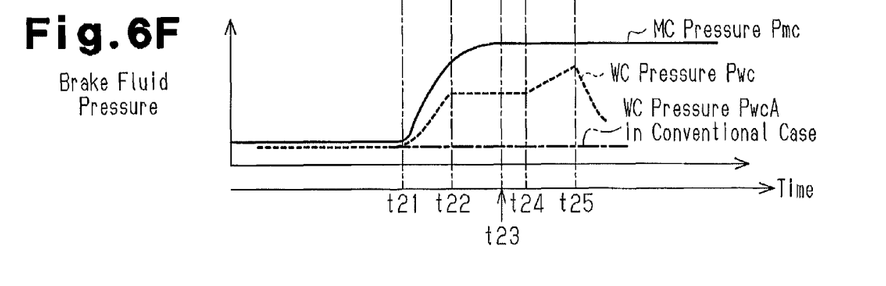

As shown in FIGS. 6C, 6D, and 6F, at first point in time t21, at which the wheel deceleration DVW of the inner rear wheel RS is not exceeding the wheel deceleration determination value KDV despite the lateral acceleration Gy in the turning exceeding the high-lateral G determination value KGy, the WC pressure Pwc of the wheel cylinder of the inner rear wheel RS is increased in accordance with the increase in the amount of brake pedal operation by the driver. That is, the braking force is applied to the inner rear wheel RS in the same manner as to the other wheels. As a result, as shown in FIG. 6A, the vehicle starts to decelerate.

As shown in FIG. 6B, when the wheel deceleration DVW exceeds the wheel deceleration determination value KDV at second point in time t22, the limit control is started, and the WC pressure Pwc of the wheel cylinder of the inner rear wheel RS is maintained. At third point in time t23, at which the limit control is being executed as above, count of the timer Ts is started when the slip ratio SLP of the inner rear wheel RS comes to be less than or equal to the slip determination value KVS, which is set to a value corresponding to the lateral acceleration Gy at that time.

Then, the timer Ts reaches the determination time KT at fourth point in time t24, and the ending condition of the limit control is satisfied. As a result, the limit control is ended, and increase in the braking force applied to the inner rear wheel RS is allowed. In this case, at the fourth point in time t24, since the starting condition of the ABS control on the inner rear wheel RS is not satisfied, the WC pressure Pwc of the wheel cylinder for the inner rear wheel RS is increased at the fourth point in time t24 and thereinafter. In so doing, the braking force applied to the inner rear wheel RS becomes great, and the slip ratio SLP of the inner rear wheel RS becomes great. When the starting condition of the ABS control is satisfied at fifth point in time t25, the ABS control is started.

At the fourth point in time t24, when the limit control is ended and the braking force applied to the inner rear wheel RS starts to be increased, the starting condition of the limit control may be satisfied again before the starting condition of the ABS control is satisfied. In this case, the limit control is started, and the braking force applied to the inner rear wheel RS is retained at a magnitude at the time of having satisfied the starting condition of the limit control.

As described above, the present embodiment achieves advantages as described below.

(1) When the wheel deceleration DVW of the inner rear wheel RS is less than or equal to the wheel deceleration determination value KDV during turning of the vehicle, the braking force corresponding to the amount of the brake pedal operation by the driver is applied to the inner rear wheel RS in the same manner as to the other wheels, since it is assumed that the gripping force of the inner rear wheel RS is sufficiently great. When the wheel deceleration DVW of the inner rear wheel RS exceeds the wheel deceleration determination value KDV, the limit control is started, and the braking force applied to the inner rear wheel RS is maintained. That is, even if the braking force is applied to the inner rear wheel RS, the vehicle turns under a state in which the gripping force of the inner rear wheel RS is ensured to some extent by the limit control. Due to this, even when the limit control is being executed, the stability of the behavior of the turning vehicle is ensured, and the deceleration of the vehicle is increased.

(2) The behavior of the turning vehicle tends to become more unstable in the case with great lateral acceleration Gy acting on the vehicle than in the case with small lateral acceleration Gy acting on the vehicle. Due to this, in the case where the lateral acceleration Gy is great, the wheel deceleration determination value KDV is set to a smaller value than in the case where the lateral acceleration Gy is small. Due to this, in the case where the behavior of the vehicle tends to become unstable due to the lateral acceleration Gy acting on the vehicle being great, the limit control is started at an early stage, so the stability of the behavior of the turning vehicle can be ensured. On the other hand, in a case where the behavior of the vehicle is unlikely to become unstable due to the lateral acceleration Gy acting on the vehicle being small, the limit control is started at a later stage, and the deceleration of the turning vehicle is increased.

(3) In the present embodiment, since the wheel deceleration determination value KDV is set to a value greater than zero, the braking force is not at all to be not at all applied to the inner rear wheel RS in the case where the driver is performing the brake pedal operation during turning of the vehicle becomes more. Due to this, the wheel speed VW of the inner rear wheel RS being extremely fast compared to the wheel speed VW of the other wheels is suppressed. Accordingly, the calculation accuracy of the body speed VS in the event of the driver performing the brake pedal operation is improved.

(4) As the vehicle state value, employing the slip ratio of the inner rear wheel RS may be considered other than the wheel deceleration DVW of the inner rear wheel RS. However, in this case, since the slip ratio is calculated by taking a wheel speed difference between the inner rear wheel RS and an outer rear wheel that is the rear wheel positioned on the outer side of the turn into consideration, the calculation thereof becomes complicated. Such a wheel speed difference changes not only due to the turning radius of the turning vehicle, but also due to the air pressure of the tires. Especially, since the limit control is a control that can be started immediately after the brake pedal operation by the driver has started, the slip ratio is not so great then. Due to this, there is a risk of generating variation in the timing to start the limit control due to a variation in a calculation accuracy of the slip ratio.

In this respect, in the present embodiment, the wheel deceleration DVW of the inner rear wheel RS is acquired as the wheel state value for determining the timing to start the limit control. The wheel deceleration DVW is a value that can be acquired without executing a correction calculation based on the wheel speed difference between the inner rear wheel RS and the outer rear wheel. Thus, the limit control can be started at a suitable timing since the variation in the calculation accuracy is suppressed with the wheel deceleration DVW compared to the slip ratio.

(5) In the case where the lateral acceleration Gy acting on the vehicle is small, the vertical load of the inner rear wheel RS does not decrease as much, and the spinning tendency of the inner rear wheel RS is small, so the limit control does not necessarily have to be executed. Due to this, in the present embodiment, the limit control is inhibited from being executed in the case where the absolute value of the lateral acceleration Gy acting on the vehicle is less than the high-lateral G determination value KDV. Due to this, unnecessary execution of the limit control is suppressed, and the deceleration of the vehicle is increased.

(6) The body speed VS of the vehicle is decelerated by the braking force being applied to the vehicle even during execution of the limit control, so the lateral acceleration Gy acting on the vehicle gradually becomes small. By so doing, since the spinning tendency of the vehicle becomes small, the stability of the behavior of the vehicle can more easily be ensured even if the gripping force of the inner rear wheel RS in the lateral direction is made small. Due to this, in the case where the slip ratio SLP of the inner rear wheel RS comes to be at or lower than the slip determination value KVS during execution of the limit control, it is determined to have shifted to the state in which the behavior of the vehicle is unlikely to be unstable, so the limit control is ended. As a result, the braking force applied to the inner rear wheel RS starts to be increased. Accordingly, the deceleration of the vehicle is increased while ensuring the stability of the behavior of the vehicle.

(7) In addition, in the present embodiment, in the case where the lateral acceleration Gy is large at that time, the slip determination value KVS is set to a smaller value than in the case where the lateral acceleration Gy is small. As a result, the timing to end the limit control is set in accordance with how prone the behavior of the vehicle is to be unstable. Accordingly, the limit control is ended while ensuring the stability of the behavior of the vehicle.

The above embodiment may be modified as follows.

The slip determination value KVS may be a constant value regardless of the lateral acceleration Gy. In this case, the slip determination value KVS is preferably set to the value in the case of the lateral acceleration Gy being great (second acceleration Gy22 in FIG. 3). Due to this, although the timing to end the limit control is somewhat delayed in the case where the lateral acceleration Gy is small, the stability of the behavior of the vehicle after ending the limit control is ensured.

The limit control may be ended only when the starting condition of the ABS control is satisfied, or when the driver stops the brake pedal operation.

The limit control may be started in a case where the wheel deceleration DVW of the inner rear wheel RS exceeds the wheel deceleration determination value KDV under the state in which the brake pedal operation is performed even if the absolute value of the lateral acceleration Gy is not greater than or equal to the high-lateral G determination value KGy. In this case, the first acceleration Gy11 is preferably set to a greater value (for example, 0.6 G) than in the case of the above embodiment (for example, 0.4 G). Due to this, the limit control is more unlikely to be started when the lateral acceleration Gy is small.

The slip ratio of the inner rear wheel RS may be acquired as the wheel state value instead of the wheel deceleration DVW of the inner rear wheel RS. In this case, in order to calculate a pure slip ratio of the inner rear wheel RS, the slip ratio is calculated by calculating the wheel speed difference between the inner rear wheel RS and the outer rear wheel, and taking the wheel speed difference into consideration.

The wheel deceleration determination value KDV may be a constant value regardless of the lateral acceleration Gy. In this case, the wheel deceleration determination value KDV is preferably set to the value in the case of the lateral acceleration Gy being great (second acceleration Gy12 in FIG. 2). Due to this, although the timing to start the limit control may somewhat be earlier in the case where the lateral acceleration Gy is small, the limit control can be started under the state in which the braking force is applied to the inner rear wheel RS.

The limit control may be ended in a case where the lateral acceleration Gy becomes less than the high-lateral G determination value KGy. In this case also, in the event where the starting condition of the limit control is satisfied again by the lateral acceleration Gy again exceeding the high-lateral G determination value KGy after the limit control has been ended, it is preferable to start the limit control.

If the flowing amount of the brake fluid to the wheel cylinders 15*a* to 15*d* from the master cylinder 22 can be adjusted by controlling an instruction current value for the booster valves 34*a* to 34*d*, the rate of increase of the braking force applied to the inner rear wheel RS may be reduced compared to the rate of increase of the braking force applied to the other wheels in the limit control. In this case, the instruction current value to the booster valve for the inner rear wheel RS is gradually increased. Specifically, a duty cycle of the signal to be given to the solenoid of the booster valve that is a target of control is gradually increased.

In ending the limit control, the instruction current value to the booster valve for the inner rear wheel RS does not necessarily have to be caused to become zero at once, but the instruction current value may be caused to become gradually small. In this case, the duty cycle of the signal to be given to the solenoid of the booster valve that is the target of control is gradually made smaller. Due to this, a sudden increase in the braking force applied to the inner rear wheel RS is suppressed.

If the vehicle is provided with a yaw rate sensor for detecting yaw rate acting on the vehicle, an estimated value of the lateral acceleration may be calculated based on the yaw rate based on a detection signal from the sensor. The estimated value of the lateral acceleration may be used as a substitute of the lateral acceleration Gy to set the timing to start and timing to end the limit control.

The yaw rate of the vehicle during execution of the limit control may be acquired, and the limit control may be ended at the time when it is determined that the yaw rate has become small.

The control target wheel of the limit control may be the inner front wheel.

The invention claimed is:

1. A vehicle brake controller that is capable of executing limit control when a driver is performing a brake pedal operation during turning of a vehicle, to limit an increase in a braking force applied to an inner wheel that is a wheel positioned on an inner side of the turn, the vehicle brake controller comprising:
- a wheel speed sensor that generates a detection signal indicating wheel speed of the inner wheel,
- wherein the vehicle brake controller is configured to
  - acquire a wheel deceleration that is a rate of change of the wheel speed of the inner wheel obtained from the detection signal of only the wheel speed sensor that corresponds to the inner wheel, and
  - start the limit control when the wheel deceleration of the inner wheel exceeds a start determination value that is set to a greater than zero.

2. The vehicle brake controller according to claim 1, wherein the vehicle brake controller is configured to set, in a case where lateral acceleration acting on the vehicle is great, the start determination value to a value smaller than that in a case where the lateral acceleration is small.

3. The vehicle brake controller according to claim 1, wherein the vehicle brake controller is configured to inhibit the control from being executed when the absolute value of lateral acceleration acting on the vehicle is less than a high-lateral G determination value.

4. The vehicle brake controller according to claim 1, wherein the vehicle brake controller is configured to end the limit control when a spin tendency value indicating a spinning tendency of the vehicle becomes lower than or equal to a spin determination value during execution of the limit control.

5. The vehicle brake controller according to claim 4, wherein the vehicle is configured to set, in a case where lateral acceleration acting on the vehicle is great, the spin determination value to a value smaller than that in a case where the lateral acceleration is small.

6. The vehicle brake controller according to claim 1, wherein the vehicle brake controller is configured to end the limit control and start an anti-lock braking control when a starting condition of the anti-lock braking control to the inner wheel is satisfied during execution of the limit control.

7. A vehicle brake control method comprising:
- identifying, when a driver is performing a brake pedal operation during turning of a vehicle, an inner wheel that is a wheel positioned on an inner side of the turn;
- acquiring a wheel deceleration that is a rate of change of the wheel speed of the inner wheel obtained from a detection signal of only a wheel speed sensor that corresponds to the inner wheel; and
- starting limit control when the acquired wheel deceleration of the inner wheel exceeds a start determination value that is set to a value greater than zero, thereby limiting an increase in a braking force applied to the identified inner wheel.

8. The vehicle brake controller according to claim 1, wherein the vehicle brake controller is configured to end the limit control when a slip ratio of the inner wheel is lower than or equal to a slip determination value for a determination time period during execution of the limit control, the slip determination value being a constant value regardless of lateral acceleration acting on a vehicle.

9. The vehicle brake control method according to claim 7, further comprising ending the limit control when a slip ratio of the inner wheel is lower than or equal to a slip determination value for a determination time period during execution of the limit control, the slip determination value being a constant value regardless of lateral acceleration acting on the vehicle.

* * * * *